Aug. 30, 1932. L. K. LOFTIN 1,875,247
CEDAR CHEST
Filed Aug. 1, 1930
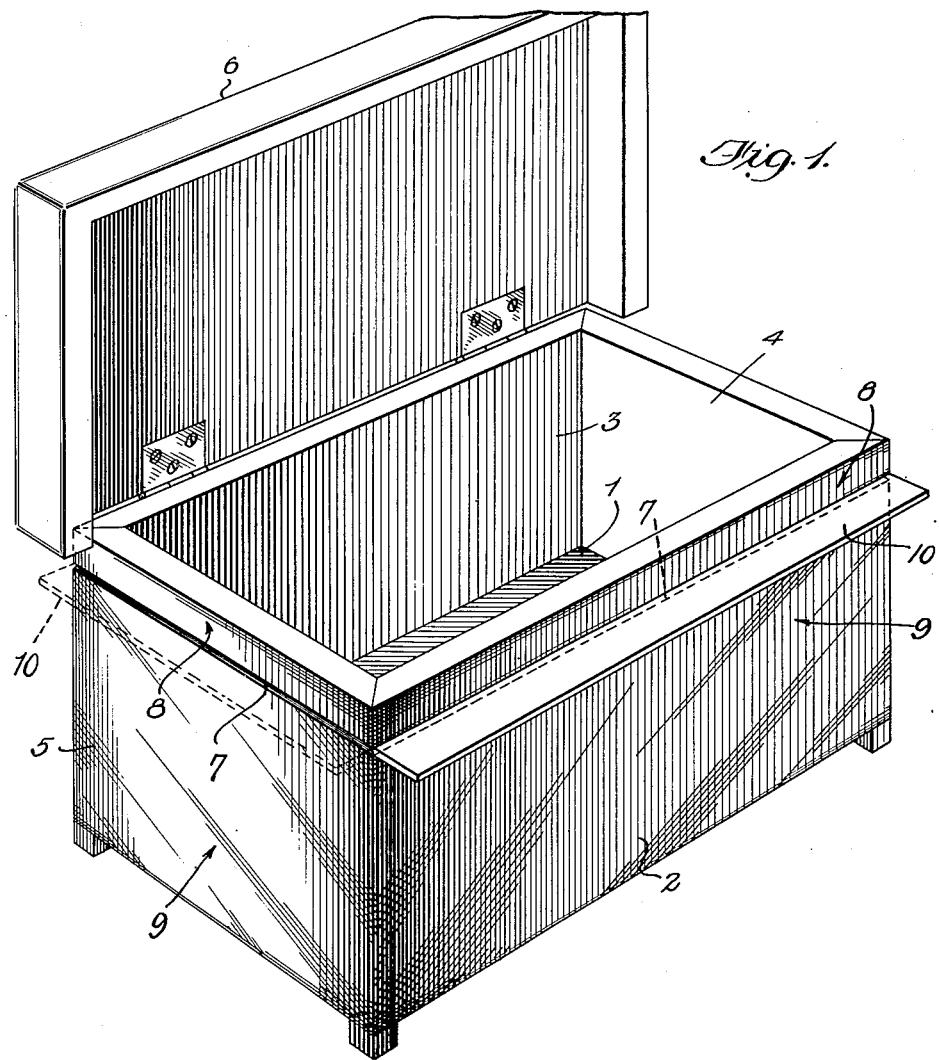
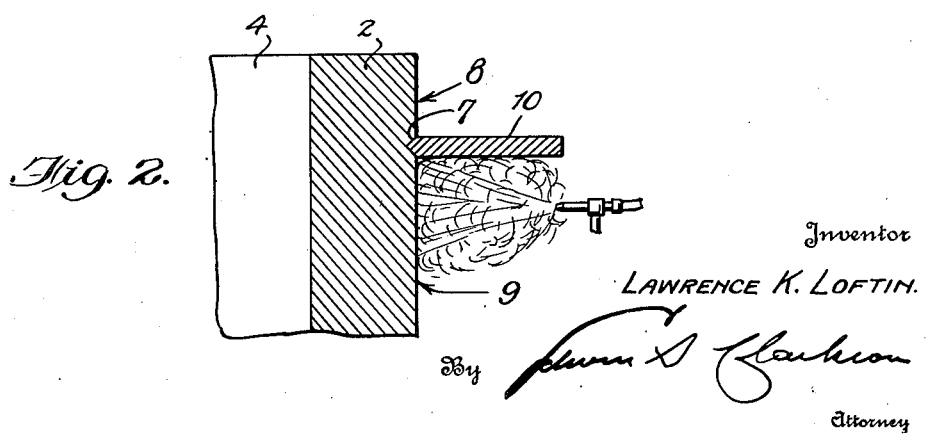
Inventor
LAWRENCE K. LOFTIN.
By
Attorney Patented Aug. 30, 1932

1,875,247

UNITED STATES PATENT OFFICE

LAWRENCE K. LOFTIN, OF ALTAVISTA, VIRGINIA, ASSIGNOR TO THE LANE COMPANY, INC., A CORPORATION OF VIRGINIA

CEDAR CHEST

Application filed August 1, 1930. Serial No. 472,443.

While I have, for the purpose of illustrating my invention, selected what is known to the trade as a cedar chest, it is, of course, obvious that my invention may with equal efficiency be embodied in wardrobes, chifferobes, closets, household furniture, and other receptacles designed for the destroying of the clothes moth larvæ found in clothing, furs and similar articles stored in such receptacles.

From experiments, conducted over quite a long period, the object of which was to produce a cedar chest that would destroy the clothes moth larvæ, I discovered the fact that aroma thrown off by the aromatic cedarwood oil, found in aromatic cedar was effective in killing moth larvæ of any age if the proper concentration could be developed, and I have also found that the two fundamentals in securing proper concentration of aroma are to get enough cedarwood oil into the chest which I am accomplishing by introducing enough cedar lumber to supply this oil and by making the chest sufficiently aroma tight. By preventing this leakage and putting enough oil in the chest I could get enough concentration to kill moth larvæ of any age and that all of this prevents the necessity of having to have clothes cleaned to get them free of moth eggs and larvæ, or beaten, or brushed, or sunned, all of which methods have been recommended by various authorities to free fabrics of moth infestation. The old type of cedar chest which was not aroma tight, according to United States Government recommendations, would kill newly hatched moth worms up to half grown (three months old) but if a person would place any fabrics into a chest that had more than half grown moth worms on them, they were so hard to kill that the cedar aroma concentration in the chest was not strong enough to kill them, but this I have been able to accomplish with my new aroma tight chest. The problem which I desired to work out was to destroy the moth larvæ present in such articles, or hatching from eggs, that might have had deposited on them when they were stored away, as it has been difficult and expensive and, in fact, impractical, to so clean every article stored as to insure the non-existence of moth larvæ or moth eggs when the article was stored away.

Experiments demonstrate the fact that the aroma of the cedar oil, which is in fact cedar oil in a highly gaseous or vapor state, suspended in the air, is extremely penetrating and that, if the article infested with moth larvæ could be maintained in a receptacle for a sufficient length of time where the cedar aroma was of sufficient density, all moth larvæ would be completely destroyed. The problem, therefore, was to first obtain a sufficient amount of cedar oil aroma, next to imprison this aroma in the receptacle so that the article would remain in an atmosphere of cedar aroma of sufficient density the required length of time to destroy the moths and, second, to so imprison and maintain the basic supply of cedar oil that the required density of aroma would be supplied over a long period of years to make the receptacle continuously effective.

It was found by experiment that cedar aroma, that is cedar oil molecules in suspension in air, is approximately seven times as heavy as air. Consequently, it is more dense at the bottom of the receptacle and, of course, when the receptacle is closed the giving off of the cedar oil molecules creates in the receptacle a vapor or gaseous pressure which, although slight as pressures are ordinarily measured, is quite sufficient to cause the cedar aroma to escape from the receptacle through any hole, crevice or crack. And, while it will escape more rapidly from a hole at the bottom of the chest, as the density is greater at the bottom, this pressure created as heretofore explained, will cause it at certain stages to escape regardless of the location of the leak. Leakage or escape of the aroma from the chest is also caused by the variation in temperature in the room outside as compared to the air within the chest. I ascertained the approximate amount of cedar oil in the average red cedar board by dry weight and constructed the chest with the proper amount of red cedar for each cubic inch of storage space. This will give a sufficient quantity of cedar oil to produce aroma of sufficient density to be effective in destroying moths, provided the density of the aroma could be maintained, leakage prevented and the escape of the cedar oil in the form of aroma could be largely confined to the inside of the chest so that it might not be wasted by escape outside into the room.

I also found that this percentage of red cedar to the cubic content of a receptacle would not only supply an aroma of sufficient density to destroy moths, but that it would continue to supply it over a long period of years, provided as above, that leakage and waste were prevented.

My experiments conducted over many years have proven that the moth killing efficiency of a cedar chest is proportionate to the amount of cedar oil present in the closure and the aroma tightness of the closure.

The cedar chest body comprises bottom, front, rear and end walls, 1, 2, 3, 4, 5, of the general construction, and joined together as disclosed in my application filed November 15, 1929, Serial No. 407,549.

The top closure 6 is of the general construction shown in my application, Serial No. 407,549.

It has been customary in finishing the exterior face of the walls of cedar chests to apply the finish over the entire face from the top edge to the bottom edge thereof, and sometimes on the top edges, and it has been found that the aroma begins its attack on the finish at the top of the walls making the finish gummy.

To overcome these conditions I provide the walls of the chest with a groove 7 which is about one inch below the top edge and extends unbrokenly entirely around the chest. That part of the walls 8 above the groove 7 is not covered with the exterior finish used on the balance of the area of the walls 9 which is below the groove. The surface 8 is covered with a finish that is neutral to the aroma of cedar oil and it has been found that the aroma, by reason of my invention, never attacks the area 8 and consequently does not attack the finish on the area 9, consequently chests constructed according to my invention maintain the desired exterior finish for the natural life of such finish.

In applying the finish to the exterior surface of the walls of the chest it is now the universal practice to apply it by the air brush, and in order to protect the surface 8 from such finish I use a baffle 10 which is pointed, or bevelled at one end, and such end is fitted snugly within, and thus held while the air brush is in operation, whereby the face 8 is completely protected against such finish.

In experiments seeking cedar chest which is, or may be made proof against the escape of the aroma of cedar oil, I have found that the aroma of cedar oil, which is in fact cedar oil in a highly gaseous, or vapor, state, suspended in the air, is extremely penetrating, and that this vapor is approximately seven times as heavy as air. When the lid of the chest is opened the aroma has a tendency to escape and it frequently settles on the top edges of the walls of the chest and attacks the varnish or other exterior finish on the said walls making said finish gummy and discoloring it, and this gummy condition spreads somewhat like a fungus growth until it completely, or substantially so, disfigures the appearance of the chest.

The object of my invention is to provide means to protect the outside finish of a cedar chest and eliminate the conditions above noted.

By the use of my invention I prevent spattering of the finish against the underside of the top, thus preventing gumming when the cedar oil aroma escapes around the top edge of the chest. The action of oil or any resinous gum will cause softening, then oxidation will take place causing a gummy and unsightly condition which is very objectionable and causes damage to clothing stored in the chest.

In the drawing:

Figure 1 is a perspective view of a cedar chest showing my invention.

Figure 2 is an enlarged detail sectional view of Fig. 1 with the baffle board in functioning position.

My invention has assumed commercial importance and has resulted in completely preventing the finish on surface 9 from being attacked and discolored by the aroma, and this is of importance to the manufacturer, the dealer, and the person using the chest.

The difference between the room temperature and the chest temperature frequently pulls the aroma out of the chest while the chest is open.

What I claim is:

1. In a moth proof receptacle, a body having an opening, and a closure for said opening, the walls of the body being provided with an upper zone surface proof against the action of cedar oil vapor, a lower zone surface provided with a commercial finish, and a groove separating said zones from each other.

2. The method of finishing the exterior surface of the walls of a cedar chest, which consists in forming a groove in the exterior face of the walls, applying a finish to said surface between the groove and the free edges of the walls that is neutral to the aroma of cedar oil, and applying the usual commercial finish to said surface below said groove.

3. The method of finishing the exterior surface of the walls of a cedar chest, which consists in forming a groove in the said surface temporarily placing a baffle in said groove, applying a finish on said surface between the groove and free edges of the walls that is neutral to the aroma of cedar oil, and applying the usual commercial finish to said surface below said baffle.

4. In a moth proof receptacle, a receptacle body having an opening, and a closure for the opening, the walls of the body being provided with a commercial finishing coating between their edges remote from the opening and a point terminating a distance from the edges of said walls about the opening, a protective coating proof against the action of cedar oil vapor on such walls between the latter-named edges and the commercial finishing coating, and a boundary separating and indicating means between the adjacent margins of the coatings.

In testimony whereof I affix my signature.

LAWRENCE K. LOFTIN.